United States Patent
Chen

(10) Patent No.: US 6,682,090 B2
(45) Date of Patent: Jan. 27, 2004

(54) STROLLER HAVING WHEEL-CARRYING FRONT AND REAR LEGS AND A HANDLE FOLDABLE RELATIVE TO ONE ANOTHER TO RESULT IN MINIMUM STORAGE SPACE

(75) Inventor: Chin-Chiao Chen, No. 1146, Chung-Shan Rd., Ta-Chia Chen, Taichung Hsien (TW)

(73) Assignee: Chin-Chiao Chen, Taichung Hsien (TW)

( * ) Notice: Subject to any disclaimer, the term of this patent is extended or adjusted under 35 U.S.C. 154(b) by 45 days.

(21) Appl. No.: 10/086,925

(22) Filed: Mar. 4, 2002

(65) Prior Publication Data

US 2003/0164606 A1 Sep. 4, 2003

(51) Int. Cl.[7] .............................. B62B 7/00; B62B 7/06
(52) U.S. Cl. ...................... 280/642; 280/650; 280/648; 280/658
(58) Field of Search ................................. 280/642, 650, 280/647, 643, 648, 657, 658; 297/16.1, 16.2

(56) References Cited

U.S. PATENT DOCUMENTS

| | | | | |
|---|---|---|---|---|
| 4,834,403 A | * | 5/1989 | Yanus et al. ................. 280/30 |
| 5,427,402 A | * | 6/1995 | Huang ......................... 280/642 |
| 5,605,409 A | * | 2/1997 | Haut et al. ................... 403/102 |
| 5,622,376 A | * | 4/1997 | Shamie ........................ 280/642 |
| 5,645,293 A | * | 7/1997 | Cheng ......................... 280/642 |
| 6,139,046 A | * | 10/2000 | Aalund et al. ............... 280/642 |
| 6,267,405 B1 | * | 7/2001 | Chen ........................... 280/647 |
| 6,273,451 B1 | * | 8/2001 | Julien et al. ................. 280/642 |
| 6,312,005 B1 | * | 11/2001 | Lin .............................. 280/647 |
| 6,533,311 B2 | * | 3/2003 | Kaneko et al. .............. 280/647 |

* cited by examiner

Primary Examiner—Brian L. Johnson
Assistant Examiner—Kelly E Campbell
(74) Attorney, Agent, or Firm—Ohlandt, Greeley, Ruggiero & Perle, L.L.P.

(57) ABSTRACT

A stroller includes pivotally connected wheel-carrying front and rear legs, and two handle tubes pivoted to the front and rear legs via a pair of joints in such a manner that the handle tubes and the front and rear legs are movable relative to one another between a storage position, in which, the front legs and the handle tubes are foldable onto the rear legs and a position of use, in which, the front legs and the handle tubes are moved away from the rear legs. Two locking units are independently operated so as to prevent untimely folding of the front legs and the handle tubes onto the rear legs when in the position of use.

4 Claims, 6 Drawing Sheets

STROLLER HAVING WHEEL-CARRYING FRONT AND REAR LEGS AND A HANDLE FOLDABLE RELATIVE TO ONE ANOTHER TO RESULT IN MINIMUM STORAGE SPACE

BACKGROUND OF THE INVENTION

1. Field of the Invention

The invention relates to a stroller, more particularly to a stroller having wheel-carrying front and rear legs and a handle foldable relative to one another so as to result in a minimum storage space.

2. Description of the Related Art

A conventional baby stroller generally includes a wheel-carrying front leg unit, a wheel-carrying rear leg unit pivotally connected to the front leg unit, and an inverted U-shaped handle which has two connecting tubes connected securely to the front and rear leg units. A seat member is disposed between the front and rear leg units. A footrest is mounted on the front leg unit below the seat member.

The aforesaid conventional stroller is disadvantageous in that the handle is not foldable relative to the rear leg unit after the front leg unit has been folded onto the rear leg unit.

SUMMARY OF THE INVENTION

The object of this invention is to provide a stroller having wheel-carrying front and rear legs and a handle foldable relative to one another so as to result in a minimum storage space.

Accordingly, a stroller of the present invention includes left and right front legs having pivot ends, left and right rear legs disposed rearwardly of the front legs and having pivot ends, a U-shaped handle, a pair of joints, a pair of linking rods, and a locking unit. The U-shaped handle includes left and right handle tubes having mounting ends. The joints are fixed respectively on the mounting ends of the handle tubes. The pivot end of each of the front legs and the pivot end of each of the rear legs are pivoted to a respective one of the joints about first and second pivots, respectively, such that the first and second pivots are parallel to each other. The linking rods are respectively interposed between and are pivotally connected to the left front and rear legs below the first and second pivots, and the right front and rear legs below the first and second pivots in such a manner that the left and right front and rear legs and the handle tubes are movable relative to one another between a storage position, in which, the front legs and the handle tubes are foldable onto the rear legs so as to result in a minimum storage space, and a position of use, in which, the front legs and the handle tubes are moved away from the rear legs. The locking unit releasably locks the rear legs onto the handle tubes so as to prevent folding of the handle tubes onto the rear legs when the front and rear legs and the handle tubes are disposed in the position of use.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
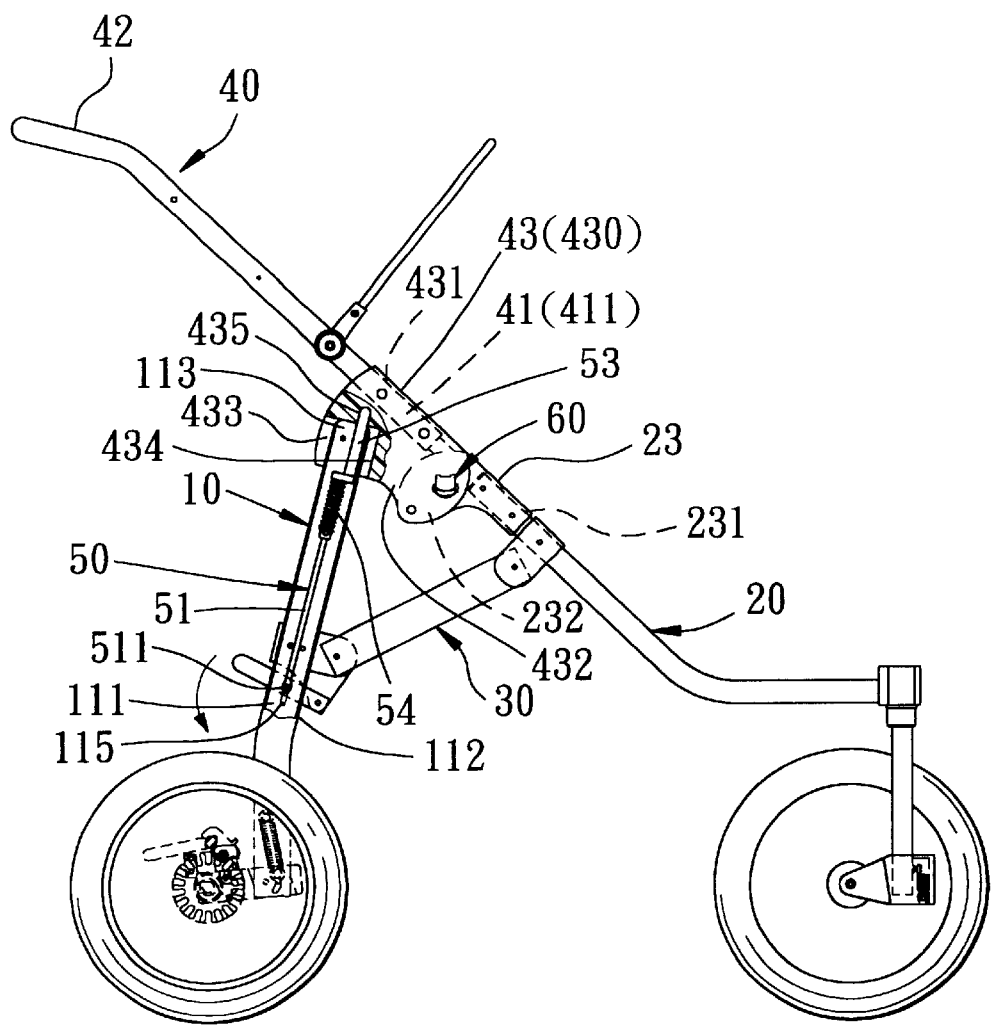
FIG. 1 is a schematic side view of a preferred embodiment of a stroller according to the present invention in a position of use, wherein a seat and a canopy are removed therefrom for the sake of clarity.
Figure 2:
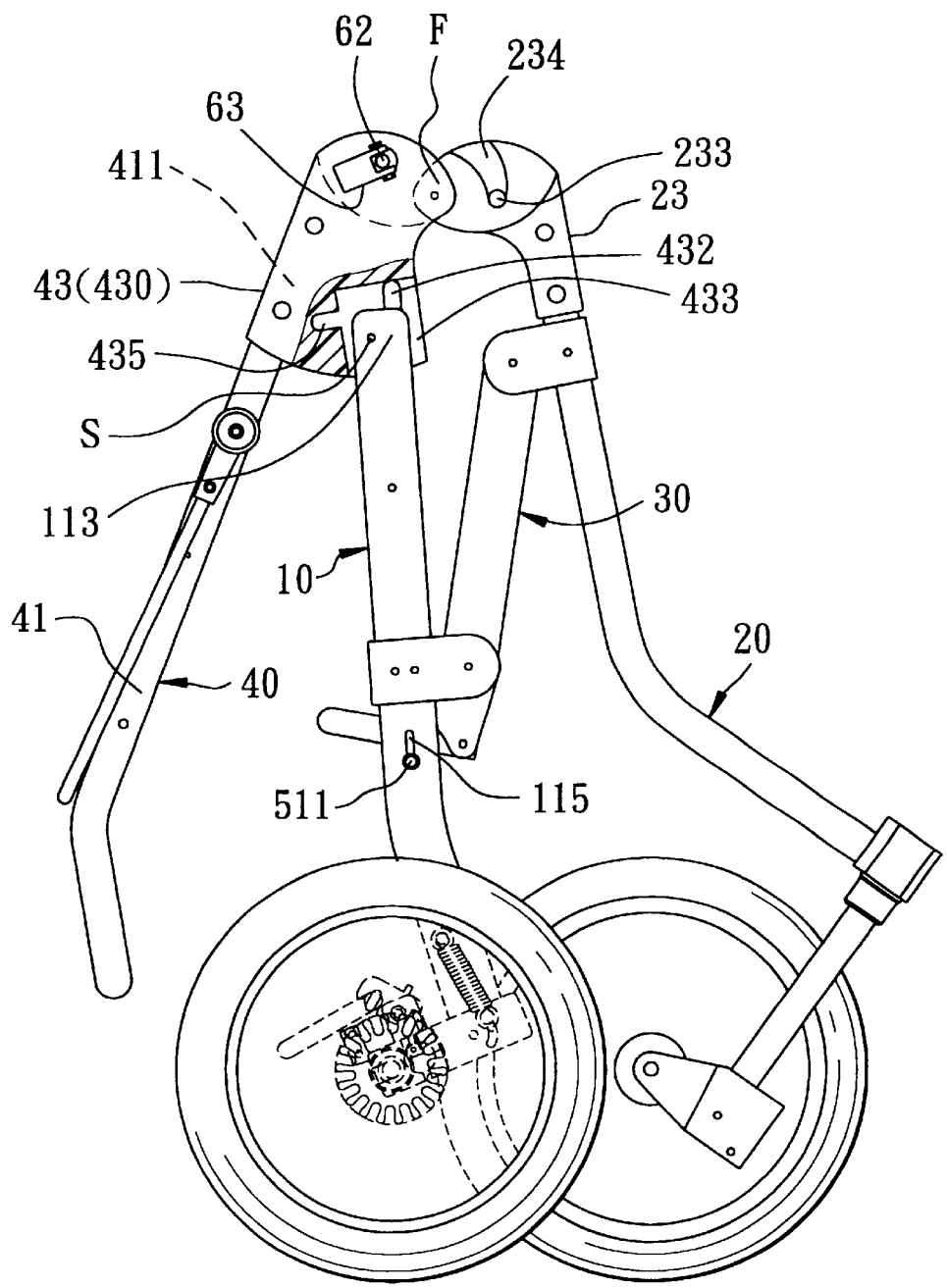
FIG. 2 is a schematic side view of the preferred embodiment in a storage position.
Figure 3:
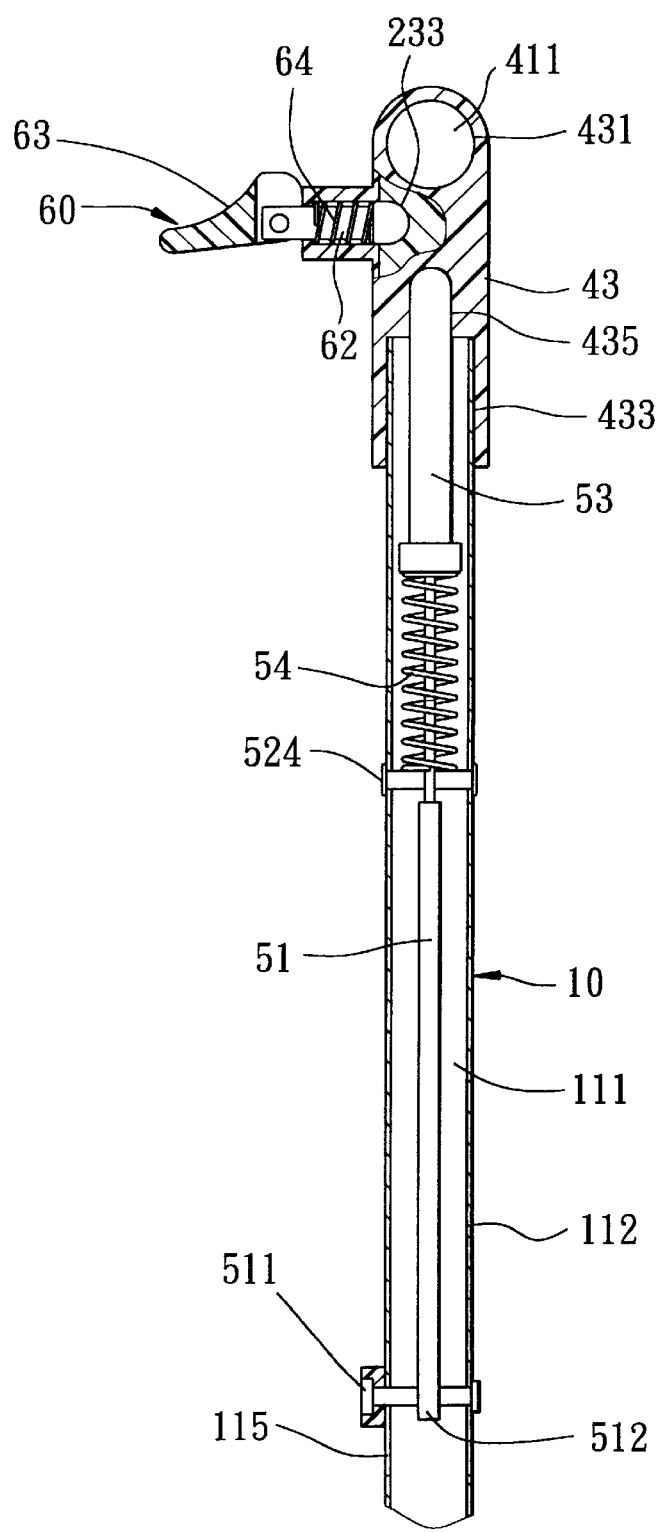
FIG. 3 is a fragmentary sectional view of the preferred embodiment, illustrating how wheel-carrying front and rear legs are locked to a handle when in the position of use.

Referring to FIGS. 1 to 3, the preferred embodiment of a stroller of this invention is shown to include a pair of wheel-carrying front legs 20, a pair of wheel-carrying rear legs 10, a U-shaped handle 40, a pair of joints 43, a pair of linking rods 30, a pair of first locking units 50, and a pair of second locking units 60.

As illustrated, the wheel-carrying front legs 20 have two pivot ends 23, which are in the form of lugs.

The wheel-carrying rear legs 10 are hollow, and are disposed rearwardly of the front legs 20 and have pivot ends 113.

The U-shaped handle 40 includes a handgrip portion 42, and left and right handle tubes 41 which extend from opposite ends of the handgrip portion 42 and which have two mounting ends 411.

The joints 43 are fixed respectively on the mounting ends 411 of the handle tubes 41. The pivot end 23 of each of the front legs 20 and the pivot end 113 of each of the rear legs 10 are pivoted to a respective one of the joints 43 about first and second pivots (F, S), respectively, in such a manner that the first and second pivots (F, S) are parallel to each other (see FIG. 3).

The linking rods 30 are respectively interposed between and are pivotally connected to left ones of the front and rear legs 20, 10 below the first and second pivots (F, S), and right ones of the front and rear legs 20, 10 below the first and second pivots (F, S) in such a manner that the front and rear legs 20, 10 and the handle tubes 41 are movable relative to one another between a storage position, in which, the front legs 20 and the handle tubes 41 are foldable onto the rear legs 10 so as to result in a minimum storage space, as best shown in FIG. 3, and a position of use, in which, the front legs 20 and the handle tubes 41 are moved away from the rear legs 10 for pushing via the handle 40, as best shown in FIG. 1.

The first locking units 50 releasably lock the rear legs 10 onto the handle tubes 41 so as to prevent folding of the handle tubes 41 onto the rear legs 40 when the front and rear legs 20, 10 and the handle tubes 41 are disposed in the position of use.

The second locking units 60 releasably lock the front legs 20 onto the handle tubes 41 so as to prevent folding of the front legs 20 onto the rear legs 10 when the front and rear legs 20, 10 and the handle tubes 41 are disposed in the position of use.

Figure 4:
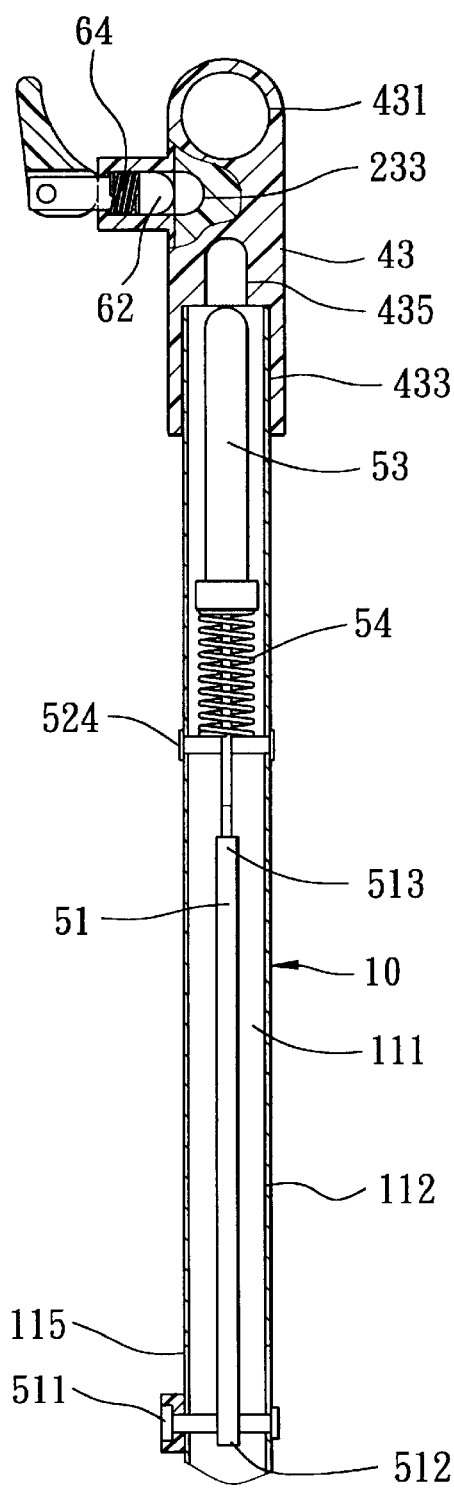
FIG. 4 is a fragmentary sectional view of the preferred embodiment, illustrating how the wheel-carrying front and rear legs can be released from the handle when in the storage position.
Figure 5:
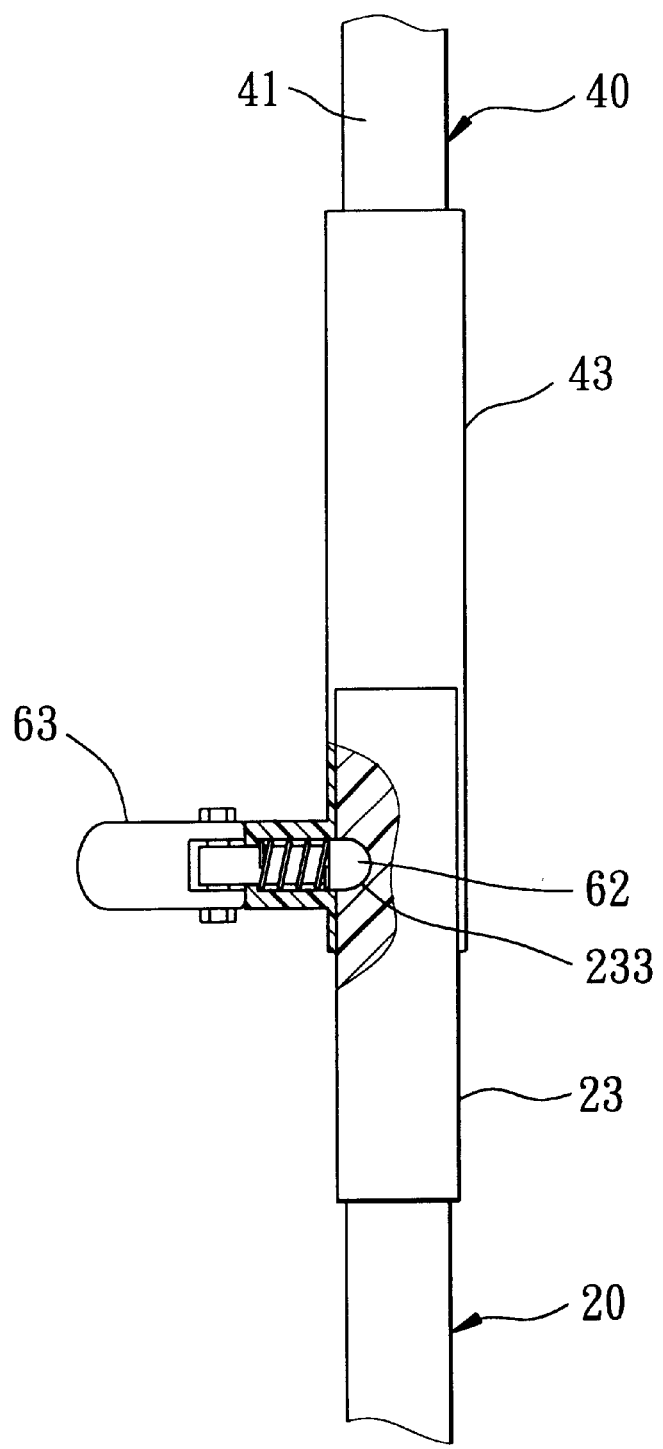
FIG. 5 is an enlarged fragmentary partly sectional view of the preferred embodiment, illustrating how the wheel-carrying front leg is locked to the handle when in the position of use.
Figure 6:
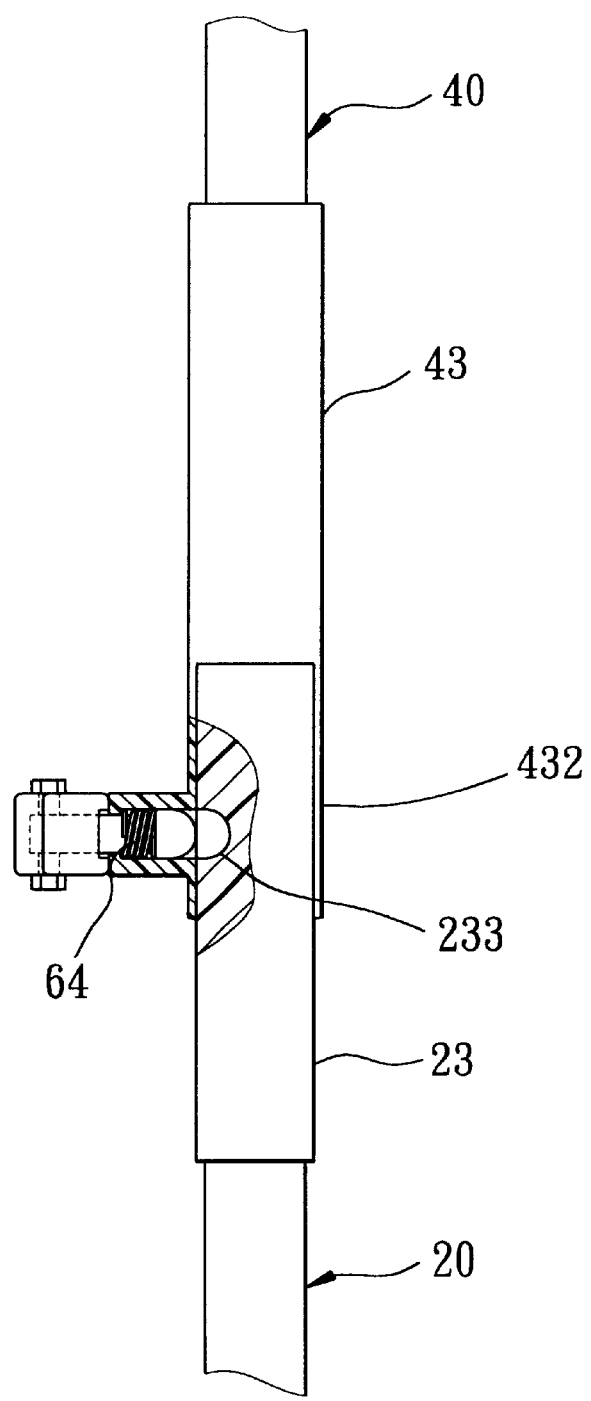
FIG. 6 is an enlarged fragmentary partly sectional view of the preferred embodiment, illustrating how the wheel-carrying front leg can be released from the handle when in the storage position.

Each of the second locking units 60 includes a retaining groove 233 formed in the pivot end 23 of each of the front legs 20, and a spring-biased tongue 62 that is mounted on each of the joints 43 and that extends releasably into a corresponding retaining groove 233 when the front and rear legs 20, 10 and the handle tubes 41 are disposed at the position of use (see FIG. 3). Preferably, a tongue-operating knob 63 is mounted on each of the joints 43, and is operably connected to the tongue 62 in such a manner that the knob 63 can be operated against biasing action thereof in order to remove the tongue 62 from the retaining groove 233, as best shown in FIGS. 4 and 6, when desired. The pivot end 23 of each front leg 20 is further formed with a guiding groove 234 in spatial communication with the retaining groove 233 to facilitate entry and exit of the tongue 62 from the retaining groove 233.

In this preferred embodiment, each of the joints 43 has a mounting body 430 fixed on the mounting end 411 of the respective one of the handle tubes 41, and a pair of ears 432 that extend frontwardly from the mounting body 430 and that define a gap therebetween for receiving the pivot end 23 of the respective one of the front legs 20. The mounting body 430 is further formed with a tube-mounting hole 431 to permit insertion of the mounting end 411 of the respective one of the handle tubes 41 fittingly therein. The mounting body 430 further has a bottom wall 434 that is formed with a recess 433 for receiving the pivot end 113 of the respective one of the rear legs 10. The recess 433 is defined by a recess-confining wall 433W which is formed with a shaft-engaging hole 435 extending inwardly from the mounting body 430.

Each of the first locking units 50 preferably includes a spring-loaded shaft 51 disposed within a respective one of the rear legs 10, and having an upper end 53 that extends into and that releasably engages a corresponding shaft-engaging hole 435 when the front and rear legs 20, 10 and the handle tube 41 are moved to the position of use. The shaft 51 is movable against biasing action so as to remove the upper end 53 from the shaft-engaging hole 435 (see FIG. 4) thereby permitting folding of the handle tubes 41 onto the rear legs 10. Preferably, each of the rear legs 10 has a tubular wall 112 which defines a shaft-receiving space 111 to receive the shaft 51 movably therein. A compression spring 54 is sleeved around the shaft 51, and biases a fixed rivet 524 that is mounted on the tubular wall 112 so as to urge the upper end 53 to extend into the shaft-engaging hole 435. A foot-press element 511 extends through two diametrically disposed axial slots 115 in the tubular wall 112, and is fastened securely to a bottom end 512 of the shaft 51 for pulling the same downward in order to remove the upper end 53 from the shaft-engaging hole 435.

When storing the stroller of the present invention, the tongue-operating knob 63 can be operated against the biasing action of a spring 64 so as to remove the tongue 62 from the corresponding retaining groove 233. Under this condition, the front legs 20 can be folded onto the rear legs 10. A downward compression on the foot-press element 511 results in removal of the upper ends 53 of the shafts 51 from the shaft-engaging holes 435 of the mounting bodies 430. The handle tubes 41 can be folded onto the rear legs 10 at this time.

Some of the advantages provided by the stroller of the present invention are as follows:

(i) The front legs 20 can be folded onto the rear legs 10 by operating the tongue-operating knob 63 to remove the tongue 62 from the corresponding retaining groove 233.

(ii) In case the storage space is too narrow to accommodate the stroller of the present invention in a half-folded position (with the front legs 20 folded onto the rear legs 10), the handle tubes 41 can be folded onto the rear legs 10 by downward pressing of the foot-press element 511. Thus, the front legs 20 and the handle tubes 41 can be folded onto the rear legs 10 to result in a minimum storage space requirement.

(iii) The first and second locking units 50, 60 ensure retention of the front and rear legs 20, 10 and the handle 41 at the position of use, and prevent untimely folding of the front legs 20 and the handle tubes 41 onto the rear legs 10 when the stroller of the present invention is in use.

With this invention thus explained, it is apparent that numerous modifications and variations can be made without departing from the scope and spirit of this invention. It is therefore intended that this invention be limited only as indicated in the appended claims.

I claim:

1. A foldable stroller comprising:

left and right front legs having pivot ends;

left and right rear legs disposed rearwardly of said front legs and having pivot ends;

a U-shaped handle including left and right handle tubes that have mounting ends;

a pair of joints fixed respectively on said mounting ends of said handle tubes, said pivot end of each of said front legs and said pivot end of each of said rear legs being pivoted to a respective one of said joints about first and second pivots, respectively, said first and said second pivots being parallel to each other;

a pair of linking rods respectively interposed between and pivotally connected to said left front and rear legs below said first and second pivots, and said right front and rear legs below said first and second pivots in such a manner that said left and right front and rear legs and said handle tubes are movable relative to one another between a storage position, in which, said front legs and said handle tubes are foldable onto said rear legs so as to result in a minimum storage space, and a position of use, in which said front legs and said handle tubes are moved away from said rear legs; and a first locking unit for releasably locking said rear legs onto said handle tubes so as to prevent folding of said handle tubes onto said rear legs when said front and rear legs and said handle tubes are disposed in said position of uses wherein each of said pair of joints has a mounting body fixed on said mounting end of respective one of said handle tubes, and a pair of ears extending frontwardly from said mounting body and defining a gap therebetween for receiving said pivot end of the respective one of said front legs, said mounting body being formed with a tube-mounting hole to permit insertion of said mounting end of the respective one of said handle tubes fittingly therein, said mounting body having a bottom wall that is formed with a recess for receiving said pivot end of the respective one of said rear legs, said recess being defined by a recess-confining wall which is formed with a shaft-engaging hole, each of said rear legs being hollow, said second locking unit including a spring-loaded shaft disposed within a respective one of said rear legs, and having an upper end extending into and releasable engaging said shaft-engaging hole when said left and right front and rear legs and said handle tube are moved to said position of use, said shaft being movable against biasing action so as to move said upper end outwardly from said shaft-engaging hole and so as to permit folding of said handle tubes onto said rear legs.

2. The stroller as defined in claim 1, further comprising a second locking unit for releasably locking said front legs onto said handle tubes so as to prevent folding of said front legs onto said rear legs when said front and rear legs and said handle tubes are disposed in said position of use.

3. The stroller as defined in claim 1, wherein said second locking unit includes a retaining groove formed in said pivot end of each of said front legs, and a spring biased tongue that is mounted on each of said joints and that extends into and that engages said retaining groove when said front and rear legs and said handle tubes are disposed at said position of use.

4. A foldable stroller comprising:

left and right front legs having pivot ends;

left and right rear legs disposed rearwardly of said front legs and having pivot ends, each of said rear legs being hollow;

a U-shaped handle including left and right handle tubes that have mounting ends;

a pair of joints fixed respectively on said mounting ends of said handle tubes, said pivot ends of said front legs being connected to said joints, said pivot ends of said rear legs being pivoted to said joints about a pivot unit;

a pair of linking rods respectively interposed between and pivotally connected to said left front and rear legs below said pivot unit, and said right front and rear legs below said pivot unit in such as manner that said handle tubes are movable relative to said rear legs between a storage position, in which, said handle tubes are foldable onto said rear legs so as to result in a minimum storage space, and a position of use, in which, said handle tubes are moved away from said rear legs;

each of said joints having a mounting body, and a pair of ears extending frontwardly from said mounting body and defining a gap therebetween for receiving fittingly said pivot end of a respective one of said front legs, said mounting body being formed with a tube-mounting hole to permit insertion of said mounting end of the respective one of said handle tubes fittingly therein, said mounting body having a bottom wall that is formed with a recess for receiving said pivot end of a respective one of said rear legs, said recess being defined by a recess-confining wall which is formed with a shaft-engaging hole; and a locking unit including a spring-loaded shaft disposed within a respective one of said rear legs, and having an upper end extending into and releasably engaging said shaft-engaging hole so as to prevent folding of said handle tubes onto said rear legs when said rear legs are disposed in said position of use, said shaft being movable against biasing action so as to remove said upper end of said shaft away from said shaft-engaging hole and so as to permit folding of said handle tubes onto said rear legs.

\* \* \* \* \*